UNITED STATES PATENT OFFICE.

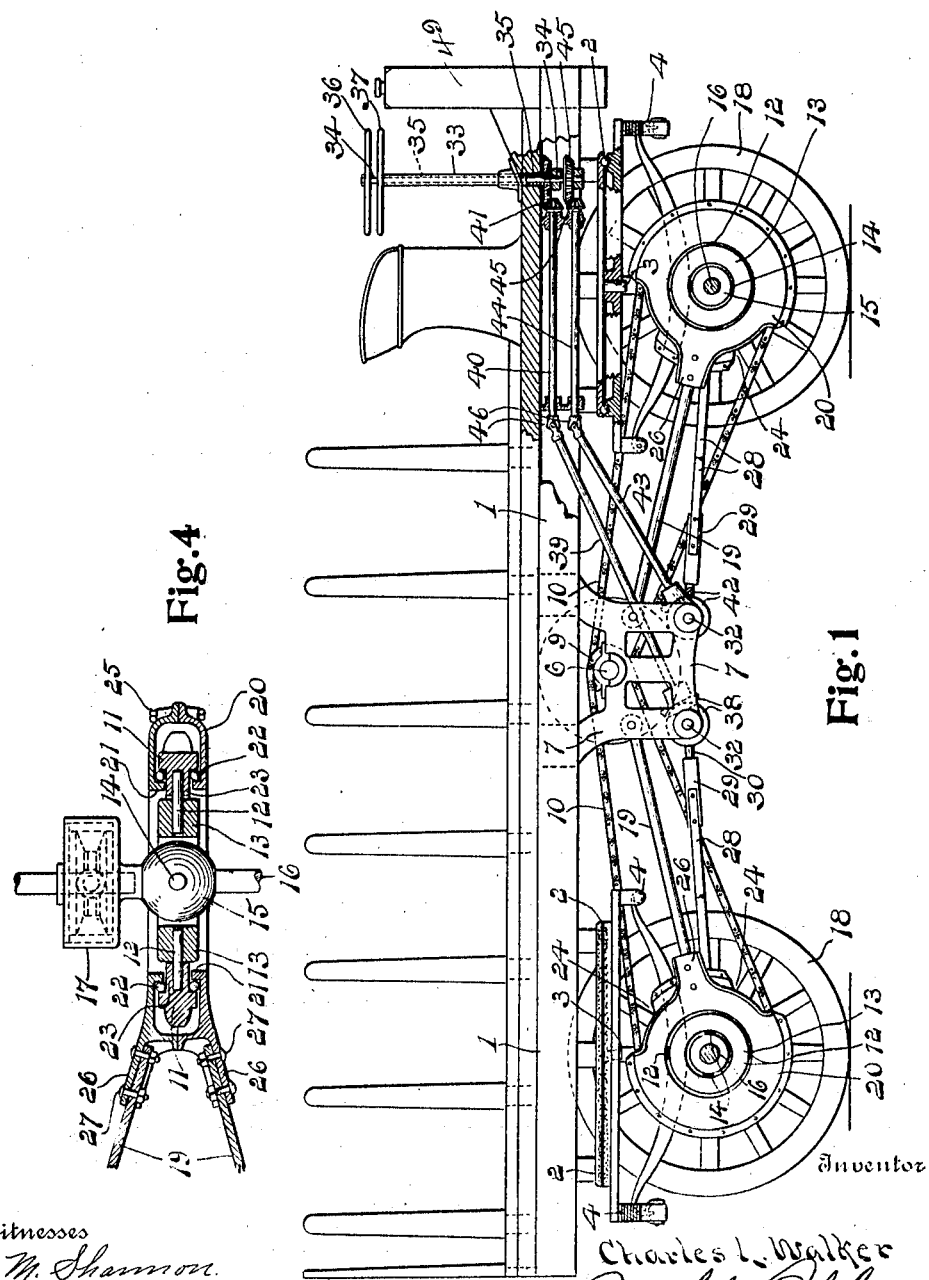

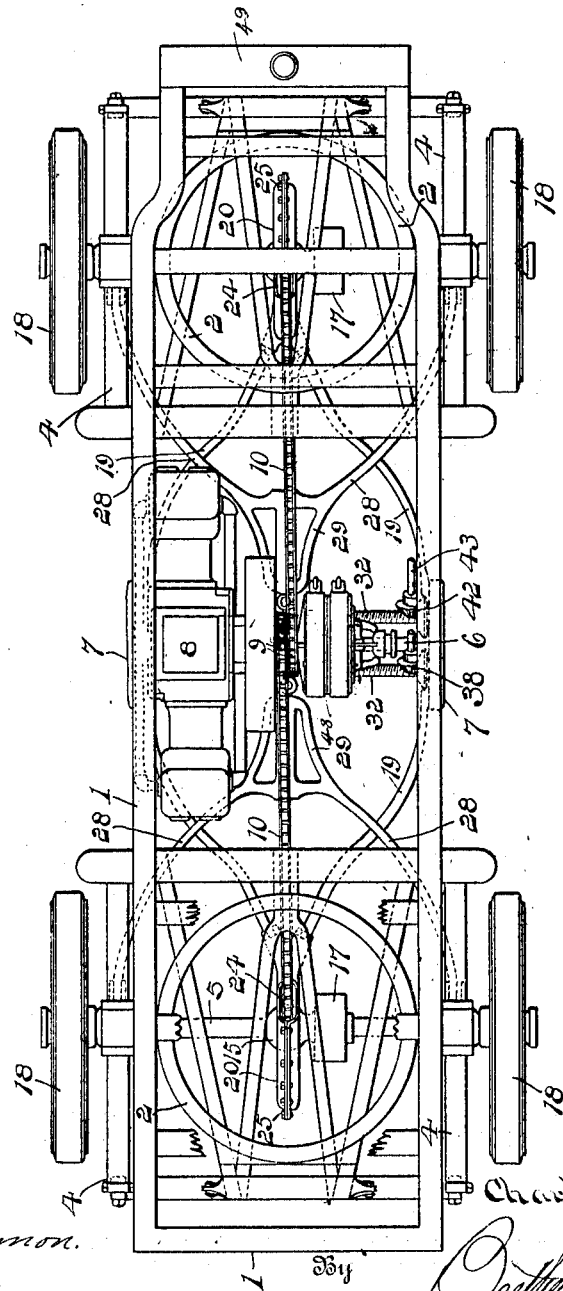

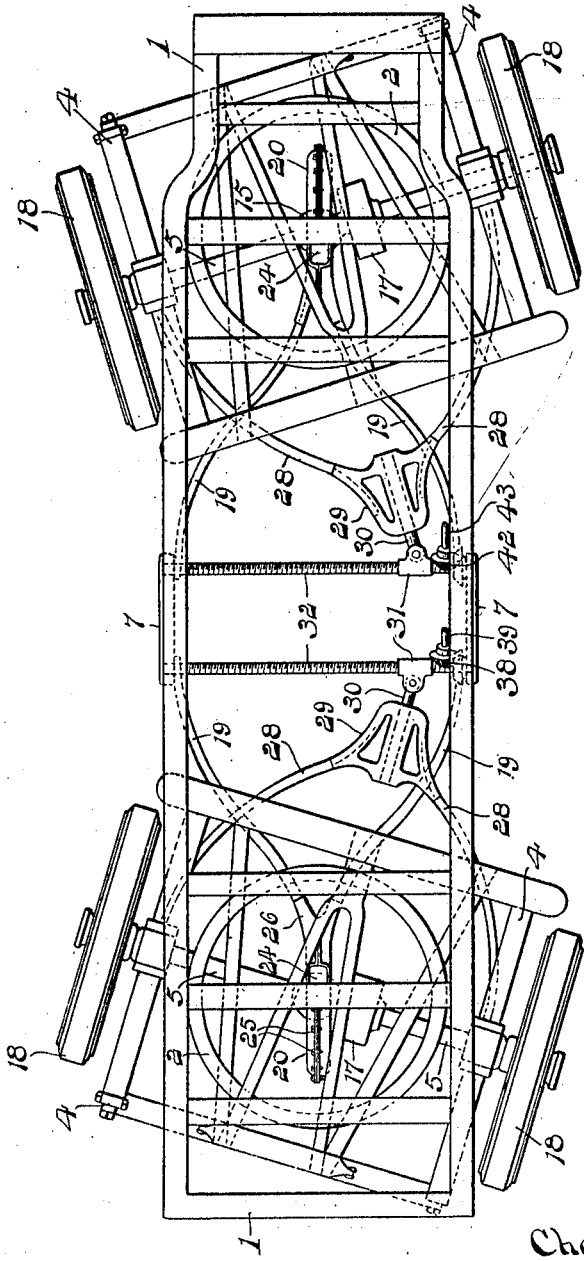

CHARLES L. WALKER, OF DETROIT, MICHIGAN, ASSIGNOR TO JAMES W. LUCAS, OF BENTON HARBOR, MICHIGAN.

AUTOMOBILE CONSTRUCTION.

1,048,770.  Specification of Letters Patent.  Patented Dec. 31, 1912.

Application filed December 18, 1909. Serial No. 533,912.

*To all whom it may concern:*

Be it known that I, CHARLES L. WALKER, a citizen of the United States of America, residing at Detroit, in the county of Wayne and State of Michigan, have invented certain new and useful Improvements in Automobile Construction, of which the following is a specification, reference being had therein to the accompanying drawings.

In automobiles for trucking and like purposes wherein heavy loads have to be handled, it is desirable that the vehicle be arranged so that it may be readily moved along side of a warehouse platform or the like.

This invention relates to automobile construction and more particularly to an arrangement thereof whereby power is transmitted to each of four bearing wheels and whereby both the forward and rear wheels are dirigible so that either end of the truck may be swung from a straight path independently.

The invention consists in the matters hereinafter set forth, and more particularly pointed out in the appended claims.

In the drawings, Figure 1 is a view partly in side elevation and partly in section of an automobile that embodies features of the invention; Fig. 2 is a plan view of a chassis with the body or loading platform removed and parts of the steering gear omitted, the wheels being in alined position; Fig. 3 is a similar view showing the wheels in angular position; and Fig. 4, is a view in detail in section of a portion of a drive mechanism.

Referring to the drawings a main frame 1 of the chassis of any preferred and suitable construction, is pivotally supported at each end by fifth wheels 2 and king-bolts indicated at 3, on platform springs 4 of any standard conventional construction. The springs are mounted on the outer stationary members 5 of differential drive axles.

A main drive shaft 6 is journaled transversely below the frame and centrally between the axles in suitably arranged and designed hangers 7 and is driven by any suitable motor, as for example, an explosive engine 8 of the double opposed two-cylinder type which is directly coupled to the shaft and is supported on the under side of the main frame 1. Drive sprockets 9 on the shaft 6 are each connected by a chain 10 with annular sprocket gears 11. Each of the latter is swiveled on pintles 12 of a gimbal ring 13 that is pivotally connected by pins 14 at right angles to the pintles 12, that extend from an inner ball or member 15 rigidly secured to one arm 16 of a two-part differential driving shaft of standard type mounted in the outer axle 5 which carries the platform springs. Differential gearing of any preferred type indicated at 17 transmits power applied to the arm 16 by the sprocket to traction bearing wheels 18 secured to the ends of the respective differential drive shafts. Such differential driving mechanism, including both gearing and axles, are not shown herein, as they do not *per se* form a part of the invention and may be constructed in any of various ways common in the art of self propelled vehicles.

The sprockets 11 are each held in the plane of rotation vertical to the main drive shaft 6 by radius yokes whose divergent arms 19 are each pivoted at their inner ends to the hangers 7 and are connected at their other ends rigidly to a casing or housing 20 which incloses the rim of the sprocket and has inturned inner annular flanges 21 forming raceways for bearing balls 22 on which the rim of the sprocket 11 rotates, a center web 23 on the rim centering the sprocket between the casing flanges. Openings indicated at 24 are formed in the casing periphery to afford clearance for the driving chains. The members of the radius yokes may be of any preferred suitable construction. As shown herein in preferred form the casing consists of oppositely disposed sections connected by bolts 25 through the flanges and provided with outwardly extending divergent lugs 26 to which the arms 19 are connected as by bolts 27 or the like.

Hounds 28 are each connected at their outer extremities to the outer portions of the wheel axles and are united at their inner ends by suitable heads 29. The latter are each centrally and longitudinally apertured and have sliding engagement with pins 30, whose inner ends are pivotally connected to sleeves 31. A pair of transverse screw-threaded steering shafts 32 are journaled in the hangers 7 and each has screw-threaded engagement with one of the sleeves 31.

A steering wheel post 33 is mounted on the forward end of the truck body and an inner steering wheel shaft 34 with a tubular wheel shaft 35 are concentrically journaled therein. A hand wheel 36 on the inner shaft and a second hand wheel 37 on the outer shaft afford means for independently turning them and are so disposed that they may be readily gripped simultaneously to admit of their simultaneous rotation by the operator's hands. One of the steering shafts 32 is connected through a pair of bevel gears 38, tumbling rod 39, shaft 40 and gears 41 with the steering wheel tubular shaft 35 and the other steering shaft is similarly connected with the shaft 34 through bevel gears 42, tumbling rod 43, shaft 44 and bevel gears 45, each of the tumbling rods being coupled to its respective shaft by a universal joint indicated at 46. The steering post is also adapted to support the motor control levers which are not indicated herein and the usual change gear and brake mechanisms are shown diagrammatically at 48. A radiator 49 is secured on the front of the car body.

By this arrangement of parts power from the motor is communicated to each of the four bearing wheels and both forward and rear axles may be swung as desired for maneuvering the truck to bring it up to a loading platform or for turning corners in a crowded street. The driving mechanism allows the axles to be turned without in any way binding the driving chains or sprockets and the body is free to tilt laterally on the axles in going over a rough road, without hindrance.

Obviously, changes in details of construction, may be made without departing from the spirit of the invention and I do not care to limit myself to any particular form or arrangement of parts.

What I claim as my invention is:—

1. In an automobile, a frame, a pair of angularly movable axles on which the frame is yieldingly supported, a two-part differentially connected drive shaft journaled in each axle, traction bearing wheels secured on the shaft, a gimbal ball secured on one member of each drive shaft, a gimbal ring pivoted on each ball, an annular sprocket pivoted on the ring and arranged to form therewith and with the ball a gimbal connection with the drive shaft, radius yokes connected to the frame, housings secured on the yokes in which the sprockets are journaled to rotate in a plane fixed in relation to the frame, a motor suspended from the frame between the axles, driving connections between the sprockets and motor, a steering-wheel-post on the frame, a pair of steering-wheel-shafts journaled in the post, hand wheels on the steering-wheel-shafts in juxtaposition and operative connections between the steering-wheel-shafts and the axles.

2. In an automobile, a frame, a pair of angularly movable axles on which the frame is yieldingly supported, a two-part differentially connected drive shaft journaled in each axle, traction bearing wheels secured on the shafts, a gimbal ball secured on one member of each drive shaft, a gimbal ring pivoted on each ball, an annular sprocket pivoted on the ring and arranged to form therewith and with the ball a gimbal connection with the drive shaft, radius yokes connected to the frame, with housings secured on the yokes in which the sprockets are journaled to rotate in a plane fixed in relation to the frame, a main drive shaft journaled in hangers between the drive shaft parallel to the axes of rotation of the sprockets, a motor rotating the drive shaft, sprocket and chain connections between the drive shaft and gimbal sprockets, a steering wheel post on the frame, a pair of steering-wheel-shafts journaled concentrically in the post and each operatively connected to an axle and a pair of hand wheels on the shafts in juxtaposition.

3. In an automobile, a frame, a pair of angularly movable axles on which the frame is yieldingly supported, a two-part differentially connected drive shaft journaled in each axle, traction bearing wheels secured on the shafts, a gimbal ball secured on one member of each drive shaft, a gimbal ring pivoted on each ball, an annular sprocket pivoted on the ring and arranged to form therewith and with the ball a gimbal connection with the drive shaft, radius yokes connected to the frame, and annular housings secured on the inner ends of the yokes in which the sprockets are journaled to rotate in a plane fixed in relation to the chassis, a main drive shaft journaled in hangers between the drive shafts parallel to the axes of rotation of the sprockets, a motor rotating the drive shaft, sprocket and chain connection between the drive shaft and gimbal sprockets, a pair of screw-threaded steering shafts journaled in the hangers, hound frames connected at their outer ends to the axles and provided at their inner ends with sleeves each in screw-threaded engagement with a steering shaft, a steering wheel post on the frame, a pair of steering wheel shafts journaled concentrically in the post, operative connections between each shaft and an axle and a pair of steering wheels each secured to a steering wheel shaft, the wheels being in juxtaposition on the post.

4. In an automobile, a frame, a pair of angularly movable axles on which the frame is yieldingly supported, a two-part differentially connected drive shaft journaled in each axle, traction bearing wheels secured on the shafts, a gimbal ball secured on one member of each drive shaft, a gimbal ring pivoted on each ball, an annular sprocket pivoted on the ring and arranged to form therewith and with the ball a gimbal connection with the drive shaft, radius yokes connected to the frame, housings secured on the yokes in which the sprockets are journaled to rotate in a plane fixed in relation to the chassis, a main drive shaft journaled in hangers between the drive shafts parallel to the axes of rotation of the sprockets, a motor rotating the drive shaft, sprocket and chain connections between the drive shaft and gimbal sprockets, a pair of screw-threaded steering shafts journaled in the hangers, hound frames connected at their outer ends to the axles and provided at their inner ends with sleeves each in screw-threaded engagement with a steering shaft, a tumbling rod geared to each steering shaft, a steering wheel post on the frame, a pair of steering wheel shafts journaled concentrically in the post, gears operatively connecting each tumbling rod with a steering-wheel-shaft and a steering wheel on each steering wheel shaft, the wheels being in juxtaposition for simultaneous manipulation.

5. In an automobile, a frame, a pair of angularly movable axles supporting the frame, a differential drive shaft journaled on each axle, traction bearing wheels on the shafts, a gimbal ball secured on one member of each drive shaft, a gimbal ring pivoted on each ball, an annular sprocket pivoted on the ring and arranged to form therewith and with the ball a gimbal connection with the drive shaft, radius yokes connected to the frame, housings secured on the yokes each provided with marginal inturned flanges on which the inner face of the sprockets are journaled, a rib on the inner periphery of each sprocket extending between the flanges of the companion housing, a main drive shaft journaled between the differential shafts parallel to the axes of the rotation of the sprockets, a motor operating the main shaft, sprocket and chain connections between the main shaft and gimbal sprocket, a steering wheel post on the frame, a pair of steering-wheel-shafts concentrically journaled in the post, a tumbling rod extending from the lower end of each shaft toward the main drive shaft, a pair of screw threaded steering shafts journaled parallel to the drive shaft, hound frames connected at their outer ends to the axles, and each provided at the other end with a sleeve in screwthreaded engagement with one of the screwthreaded shafts, bevel gears connecting one end of each tumbling rod with a screwthreaded shaft and bevel gears connecting the other end of each tumbling rod with a steering wheel shaft.

6. In an automobile, a frame, a pair of angularly movable axles supporting the frame, a differential drive shaft journaled on each axle, traction bearing wheels on the shafts, a gimbal ball secured on one member of each drive shaft, a gimbal ring pivoted on each ball, an annular sprocket pivoted on the ring and arranged to form therewith and with the ball a gimbal connection with the drive shaft, radius yokes connected to the frame, housings secured on the yokes, a pair of inner peripheral flanges on each housing on which the inner face of the sprocket is journaled, a central rib on each sprocket extending between the housing flanges, bearing balls interposed between the sprockets and housings for which the said flanges and ribs form race-ways, a main drive shaft journaled on the frame parallel to the axes of rotation of the sprockets, a motor operating the drive shafts, sprocket and chain connections between the main shafts and gimbal sprockets, a steering wheel post on the frame, a pair of steering-wheel-shafts concentrically journaled in the post, a tumbling rod extending from the lower end of each shaft toward the main drive shaft, a pair of screw threaded steering shafts journaled parallel to the drive shaft, hound frames connected at their outer ends to the axles, and each provided at the other end with a sleeve in screwthreaded engagement with one of the screwthreaded shafts, bevel gears connecting one end of each tumbling rod with a screwthreaded shaft and bevel gears connecting the other end of each tumbling rod with a steering wheel shaft.

7. In an automobile, a frame, a pair of angularly movable axles supporting the frame, a differential drive shaft journaled on each axle, traction bearing wheels on the shafts, a motor, a main shaft journaled on the frame and driven by the motor, means operatively connecting the main shaft and differential shafts to rotate the latter, a steering wheel post on the frame, a pair of steering wheel shafts concentrically journaled in the post, connections between each shaft and one of the axles for swinging the latter, and hand wheels on the steering-wheel-shafts in juxtaposition for simultaneous manipulation.

In testimony whereof I affix my signature in presence of two witnesses.

CHARLES L. WALKER.

Witnesses:
   Lewis E. Flanders,
   Otto F. Barthel.